US008456465B2

(12) United States Patent
Moon et al.

(10) Patent No.: US 8,456,465 B2
(45) Date of Patent: Jun. 4, 2013

(54) DISPLAY APPARATUS UTILIZING PROTECTIVE IMAGE FOR A PERIOD OF DISPLAY OF 3D IMAGE

(75) Inventors: Seonghak Moon, Seoul (KR); Daejin Myoung, Seoul (KR); Byungsoo Song, Seoul (KR); Namjin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1031 days.

(21) Appl. No.: 12/244,609

(22) Filed: Oct. 2, 2008

(65) Prior Publication Data

US 2009/0303232 A1 Dec. 10, 2009

(30) Foreign Application Priority Data

Jun. 10, 2008 (KR) ........................ 10-2008-0053940

(51) Int. Cl.
*G06T 15/00* (2011.01)
*G06T 1/00* (2006.01)

(52) U.S. Cl.
USPC ........................................... 345/419; 345/418

(58) Field of Classification Search
None
See application file for complete search history.

(56) References Cited

U.S. PATENT DOCUMENTS

| | | | | |
|---|---|---|---|---|
| 6,108,005 | A * | 8/2000 | Starks et al. | 345/419 |
| 6,977,629 | B2 * | 12/2005 | Weitbruch et al. | 345/6 |
| 2004/0070556 | A1 * | 4/2004 | Weitbruch et al. | 345/60 |
| 2004/0223049 | A1 * | 11/2004 | Taniguchi et al. | 348/14.02 |
| 2004/0239685 | A1 * | 12/2004 | Kiyokawa et al. | 345/619 |
| 2006/0268021 | A1 * | 11/2006 | Lin et al. | 345/690 |
| 2007/0228945 | A1 * | 10/2007 | Park | 313/505 |
| 2007/0236493 | A1 * | 10/2007 | Horiuchi et al. | 345/419 |

FOREIGN PATENT DOCUMENTS

| | | |
|---|---|---|
| KR | 2003-0014097 | 2/2003 |
| KR | 10-2005-0001061 | 1/2005 |
| KR | 10-2005-0102899 | 10/2005 |
| KR | 10-2007-0113472 | 11/2007 |

* cited by examiner

*Primary Examiner* — Daniel Hajnik
(74) *Attorney, Agent, or Firm* — KED & Associates, LLP

(57) ABSTRACT

A display apparatus is disclosed. The display apparatus includes a display panel that displays at least one of a two dimensional (2D) image and a three dimensional (3D) image, and a driver that is driven so as to display an image on the display panel. The driver includes a 3D image conversion unit that converts the 3D image into a protective image if a length of a period during which the 3D image is displayed on the display panel is longer than a length of a first period.

10 Claims, 14 Drawing Sheets

DISPLAY APPARATUS UTILIZING PROTECTIVE IMAGE FOR A PERIOD OF DISPLAY OF 3D IMAGE

DISPLAY APPARATUS

This application claims the benefit of Korean Patent Application No. 10-2008-0053940 filed on Jun. 10, 2008, which is hereby incorporated by reference.

BACKGROUND

1. Field

Exemplary embodiments relate to a display apparatus.

2. Description of the Related Art

A display apparatus generally includes a display panel displaying an image and a driver for driving the display panel. The driver supplies driving signals to the display panel, thereby displaying the image on the display panel.

Studies have been actively carried out to improve the image quality of a 3D image displayed by the display apparatus.

SUMMARY

Additional features and advantages of the exemplary embodiments will be set forth in the description which follows, and in part will be apparent from the description, or may be learned by practice of the exemplary embodiments. The objectives and other advantages of the exemplary embodiments will be realized and attained by the structure particularly pointed out in the written description and claims hereof as well as the appended drawings.

In one aspect, a display apparatus comprises a display panel that displays at least one of a two dimensional (2D) image and a three dimensional (3D) image, and a driver that is driven so as to display an image on the display panel, the driver including a 3D image conversion unit that converts the 3D image into a protective image if a length of a period during which the 3D image is displayed on the display panel is longer than a length of a first period.

It is to be understood that both the foregoing general description and the following detailed description are exemplary and explanatory and are intended to provide further explanation of embodiments as claimed.

BRIEF DESCRIPTION OF THE DRAWINGS

The accompanying drawings, which are included to provide a further understanding of exemplary embodiments and are incorporated in and constitute a part of this specification, illustrate the exemplary embodiments and together with the description serve to explain the principles of the exemplary embodiments. In the drawings.

DETAILED DESCRIPTION OF EMBODIMENTS

Reference will now be made in detail embodiments of which are illustrated in the accompanying drawings.

Figure 1:
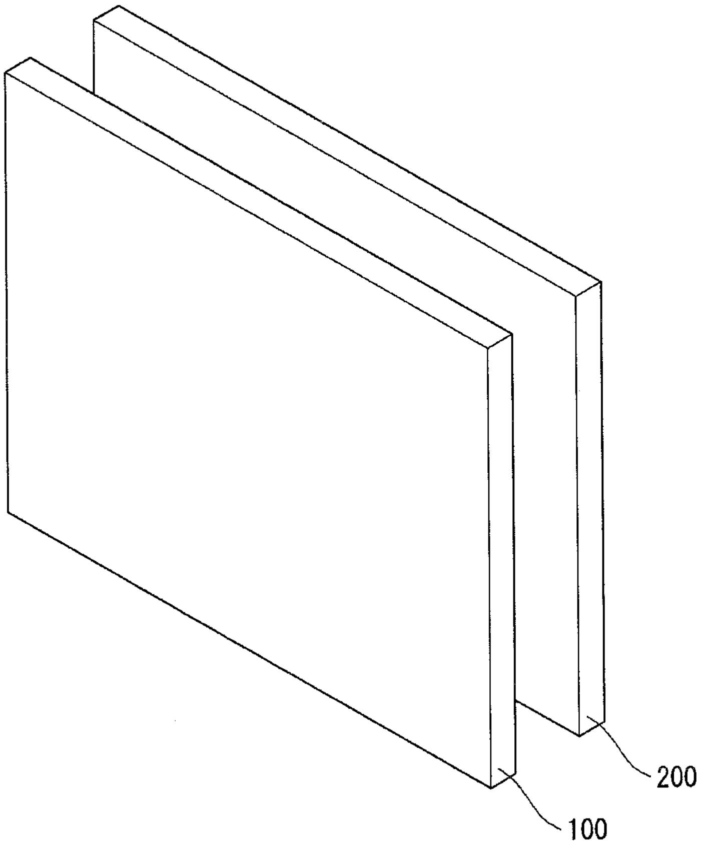
FIG. 1 illustrates a display apparatus according to an exemplary embodiment.

FIG. 1 illustrates a display apparatus according to an exemplary embodiment.

As shown in FIG. 1, the display apparatus includes a display panel 100 and a driver 200 for driving the display panel.

The display panel 100 may display at least one of a two dimensional (2D) image and a three dimensional (3D) image.

Recently, as a display field visually displaying information of various electrical signals has been rapidly grown, various kinds of flat panel displays having excellent characteristics such as thin profile, lightness in weight, and low power consumption have been used as the display panel 100. Examples of the flat panel displays include a liquid crystal display (LCD), a plasma display panel (PDP), a field emission display (FED), and an electroluminescence display (ELD).

The driver 200 can be driven so as to display images on the display panel 100.

The driver 200 may include a 3D image conversion unit and a selection unit. If a length of a period during which the 3D image is displayed on the display panel 100 is longer than a length of a first period, the 3D image conversion unit converts the 3D image into a protective image. In this case, a user may select whether to convert the 3D image into the protective image or continuously display the 3D image on the display panel 100, using the selection unit.

Figure 2:
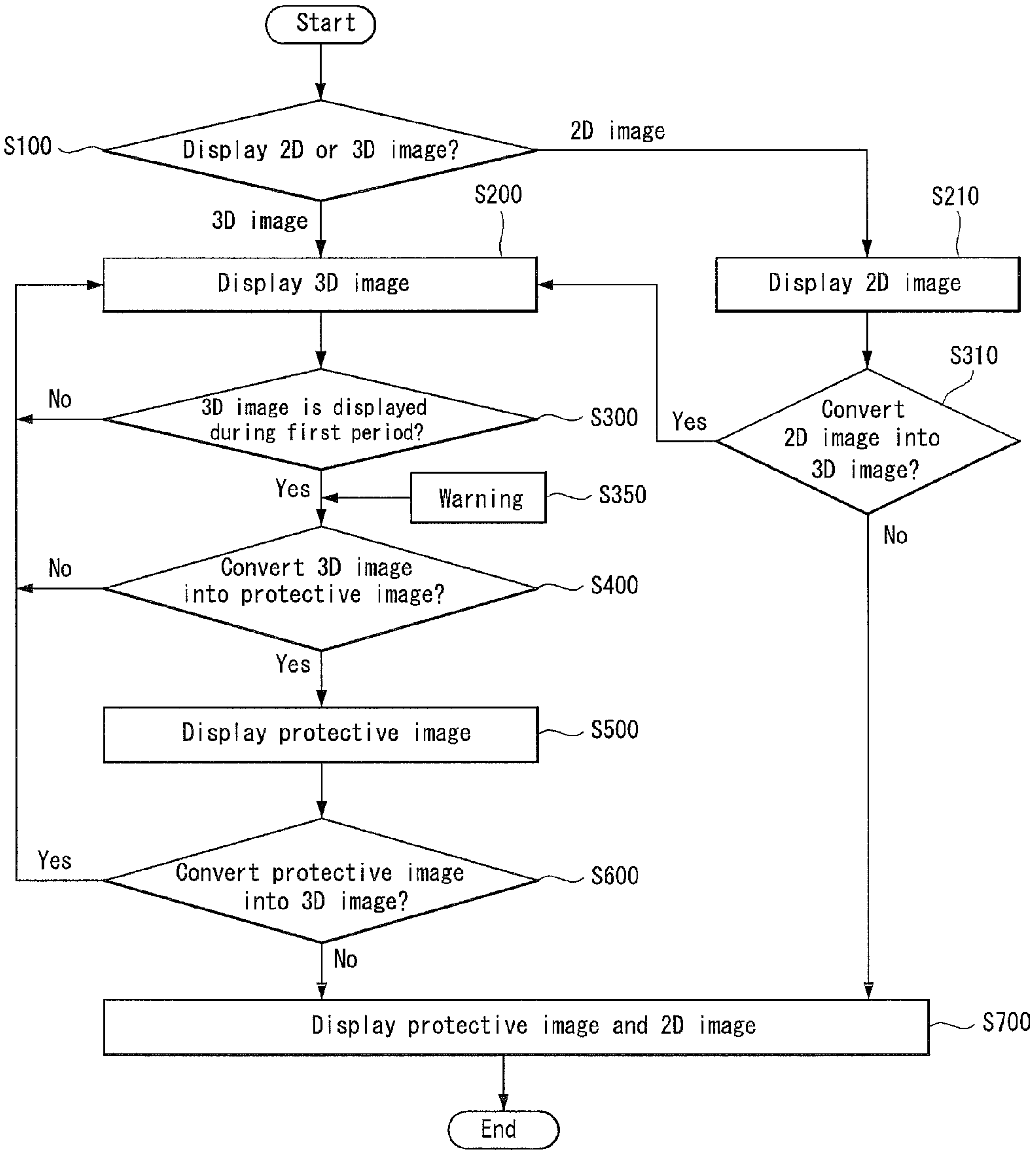
FIG. 2 is a flow chart illustrating a method of driving the display apparatus according to the exemplary embodiment.

FIG. 2 is a flow chart illustrating a method of driving the display apparatus according to the exemplary embodiment.

As shown in FIG. 2, the user may work the display apparatus so that the display apparatus displays an image in step S100.

The image may be a 2D image or a 3D image automatically displayed by the display apparatus in response to a broadcasting signal received from the outside. Or, the user may display a 2D image or a 3D image automatically displayed by the display apparatus in response to the broadcasting signal received from the outside as a 2D image or a 3D image that the user wants.

The display apparatus displays a 3D image in step S200 and displays a 2D image in step S210.

If the display apparatus displays the 2D image, the user may select whether to convert the 2D image into a 3D image or continuously display the 2D image, in step S310. In other words, the user may continuously display the 2D image or display the 3D image converted from the 2D image.

If the display apparatus displays the 3D image, it is determined whether a length of a period during which the 3D image is displayed is shorter or longer than a length of a first period, in step S300. More specifically, if the length of the display period of the 3D image is equal to or shorter than the length of the first period, the driver allows the 3D image to be continuously displayed on the display panel. If the length of the display period of the 3D image is longer than the length of the first period, the driver allows the 3D image to be converted into a protective image.

Further, if the length of the display period of the 3D image is longer than the length of the first period, the driver may send the user a warning. For example, the warning may say that a long time viewing of 3D image may cause dizziness or vomiting, and therefore, the 3D image has to be converted into a protective image so as to protect user's eyesight. The warning may be displayed on an upper portion or a lower portion of the screen on which the 3D image is displayed, but is not limited thereto. In other words, any method may be used to send the warning as long as the warning is sent to the user.

The user can adjust the length of the period during which the 3D image is displayed by adjusting the length of the first period. Even if the user freely adjusts the length of the first period, when the user watches the 3D image for a long time by setting the length of the first period to be long, the warning may be displayed on the screen on which the 3D image is displayed.

Afterwards, the user may select whether to convert the 3D image into the protective image or continuously display the 3D image in step S400. As a result, the user may continuously watch the 3D image or the protective image converted from the 3D image.

In step S500, the display apparatus displays the protective image.

Afterwards, if a length of a display period of the protective image converted from the 3D image is longer than a length of a second period, the protective image may be converted into the 3D image. In other words, the user may select whether to convert the protective image into the 3D image or continuously display the protective image in step S600. As a result, the user may continuously display the protective image or display the 3D image converted from the protective image.

The user may freely adjust the length of the second period in the same way as the first period. The user can adjust a displayed period of the 2D image.

Afterwards, in step S700, the display apparatus displays the protective image or the 2D image.

As described above, the user may watch the protective image or the 2D image at his will.

Figure 3:
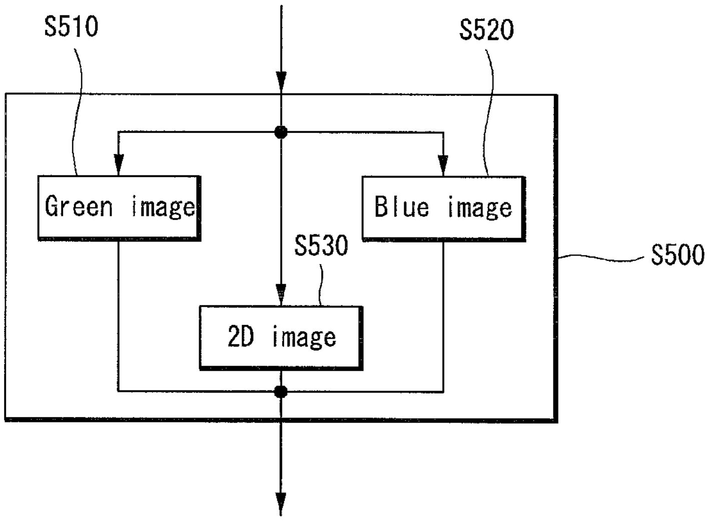
FIG. 3 is a diagram for illustrating a protective image.

FIG. 3 is a diagram for illustrating a protective image.

As shown in FIG. 3, the display apparatus may display various protective images.

If the user watches the 3D image for a long time, the 3D image may be converted into the protective image so as to protect user's eyesight.

The protective image may be one of a green image in which the entire image gradually changes to green, a blue image in which the entire image gradually changes to blue, or a 2D image.

Because the entire 3D image changes to the green image or the blue image, the user's eyesight can be protected. The green image or the blue image can reduce user's eyestrain.

Further, the 2D image converted from the 3D image may be displayed. In this case, the 3D image is gradually converted into the 2D image. Because the 3D image is gradually converted into the 2D image or the various protective images, space estrangement that the user can feel, can be minimized, and also the user's eyestrain can be reduced.

Further, after the 3D image may be converted into the green image or the blue image, the green image or the blue image may be converted into the 2D image. Otherwise, after the 3D image may be converted into the 2D image, the 2D image may be converted into the green image or the blue image. In other words, because the protective image is displayed so as to protect the user's eyesight after the user watches the 3D image for a long time, the green image, the blue image, or the 2D image may be randomly displayed.

The protective image may be an image previously stored in the display apparatus. The user may change the protective image. For example, the user installs a program for the protective image, and thus can change the protective image.

Figure 4:
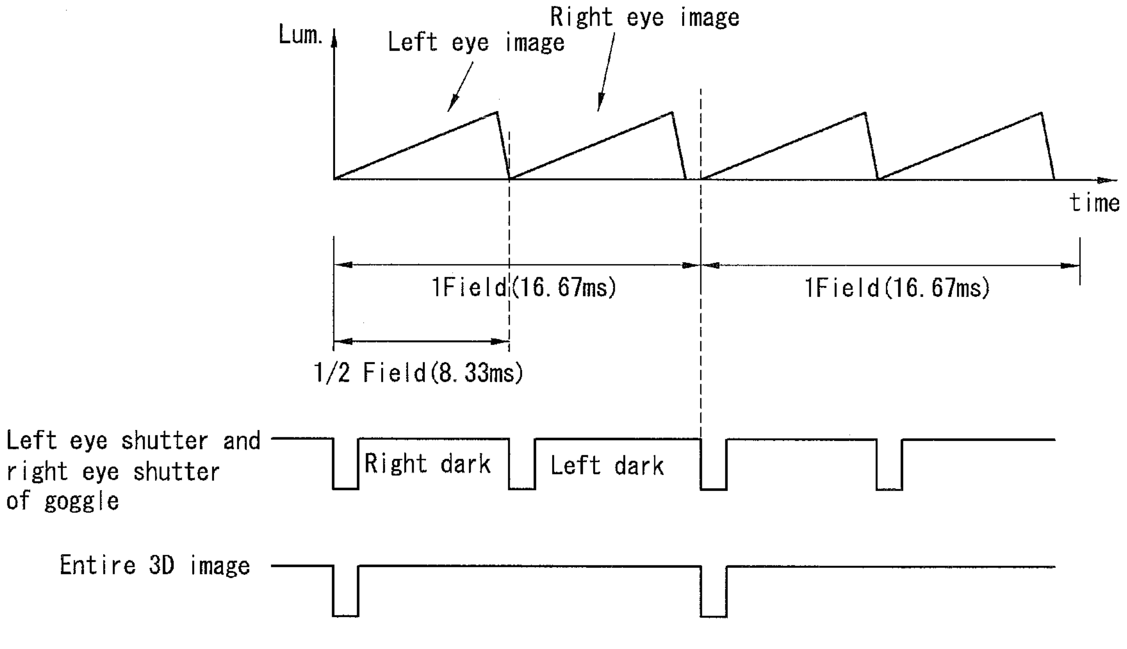
FIGS. 4 and 5 are diagrams for illustrating a conversion of a 3D image into a protective image.
Figure 5:
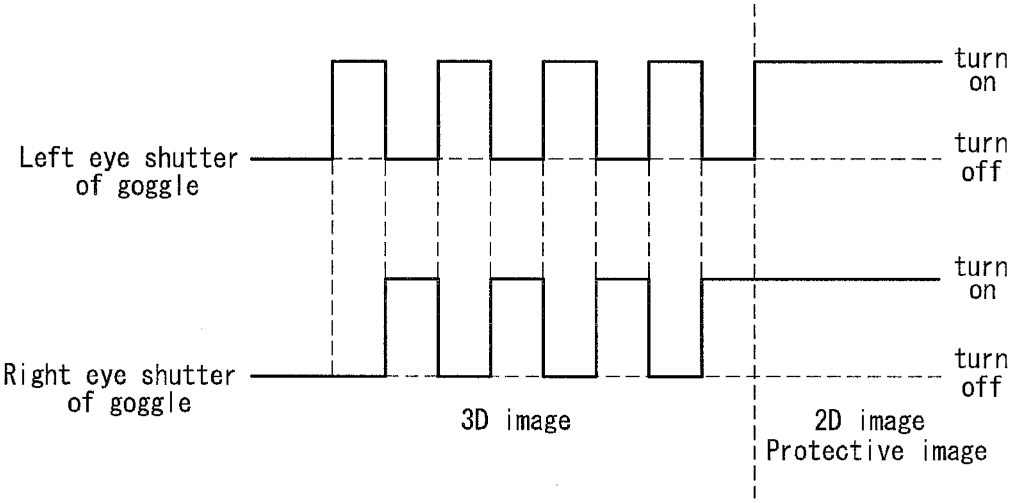

FIGS. 4 and 5 are diagrams for illustrating a conversion of a 3D image into a protective image.

As shown in FIG. 4, the display apparatus according to the exemplary embodiment includes the display panel displaying at least one of a 2D image and a 3D image, and the driver for driving the display panel. The driver includes the 3D image conversion unit that converts the 3D image into a protective image if a length of a period during which the 3D image is displayed on the display panel 100 is longer than the length of the first period.

The 3D image may include at least two images each having a different time point. More specifically, the same image in left and right directions is incident on user's left and right eyes, and a viewing difference between the user's left and right eyes are combined to obtain the 3D image. In other words, the 3D image may include a left eye image and a right eye image. Hence, the 3D image can be naturally and elaborately displayed.

The display apparatus may include a 3D goggle for 3D image.

The user can efficiently watch the 3D image using the 3D goggle.

As above, one frame may be divided into two sub-frames. More specifically, one frame may be divided into a first sub-frame during which the left eye image is displayed and a second sub-frame during which the right eye image is displayed.

A shutter for the right eye image is turned off so that the left eye image is displayed during the first sub-frame, and a shutter for the left eye image is turned off so that the right eye image is displayed during the second sub-frame. Hence, the 3D image can be displayed.

Because the left eye shutter and the right eye shutter are alternately turned on or off, the right eye image can be continuously displayed when the left eye image is displayed, and also the left eye image can be continuously displayed when the right left image is displayed. Hence, the 3D image can be easily converted into the protective image by controlling turn-on operations of the left eye shutter and the right eye shutter.

Accordingly, the protective image may be one of the at least two images each having the different time points included in the 3D image, and may be an image obtained by interpolating the at least two images.

The 3D image may be displayed using the first and second sub-frames, but the protective image may be displayed using one of the first and second sub-frames.

Therefore, a frequency of the protective image may be one half of a frequency of the 3D image. The frequency of the protective image may be a frequency of a liquid crystal shutter type. When the 3D image is converted into the protective image or the protective image is converted into the 3D image using the 3D goggle of the liquid crystal shutter type, objects on the 3D image can be clearly displayed.

The right eye shutter of the 3D goggle is turned off so as to display the left eye image during the first sub-frame, and the left eye shutter of the 3D goggle is turned off so as to display the right eye image during the second sub-frame. Hence, the 3D image is displayed.

When the left eye shutter and the right eye shutter of the 3D goggle are simultaneously turned on, the 3D image can be easily converted into the protective image.

Because the 3D image is easily converted into the protective image or the protective image is easily converted into the 3D image, the user can freely watch the 2D image or 3D image depending on his selection.

Figure 6:
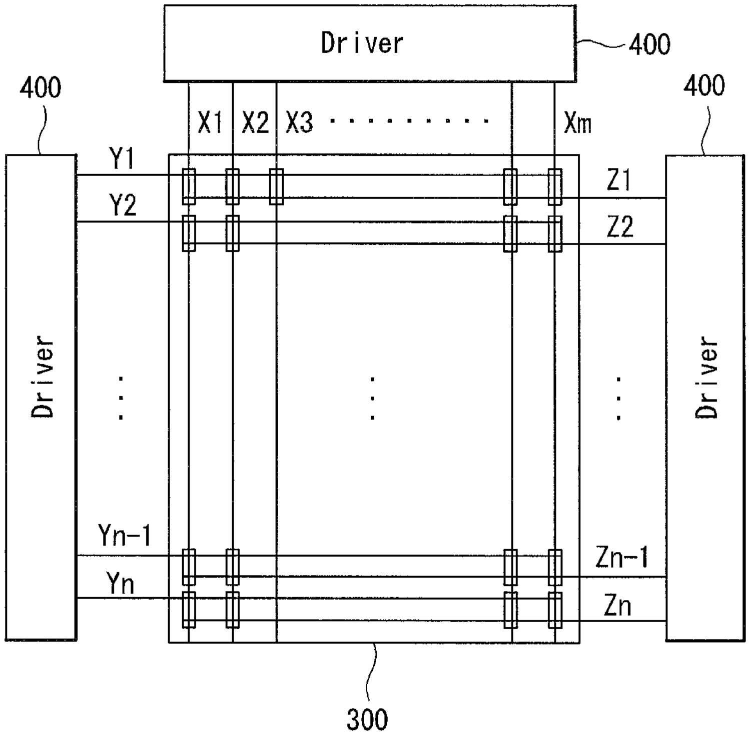
FIG. 6 illustrates the display apparatus according to another exemplary embodiment.
Figure 7:
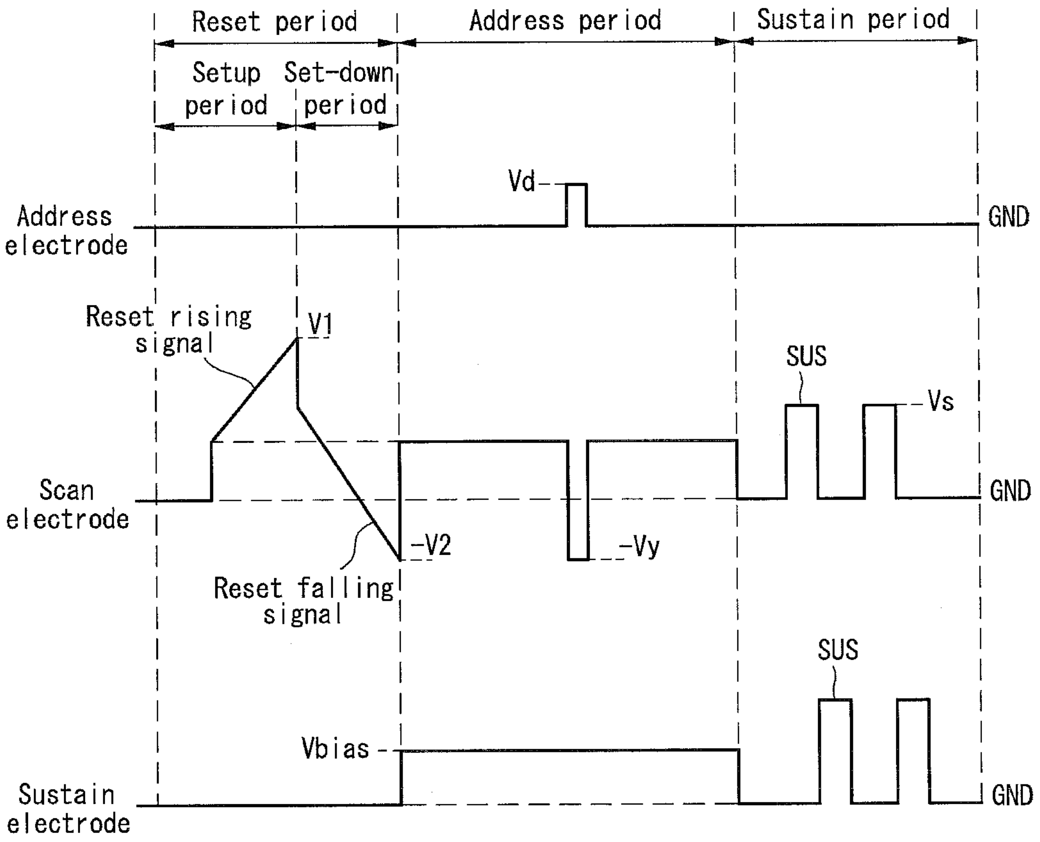
FIG. 7 illustrates driving signals of the display apparatus.

FIG. 6 illustrates the display apparatus according to another exemplary embodiment, and FIG. 7 illustrates driving signals of the display apparatus.

As shown in FIGS. 6 and 7, the plasma display apparatus according to another exemplary embodiment includes a plasma display panel 300 and a driver 400.

The plasma display panel 300 includes an upper panel (not shown) and a lower panel (not shown) that are coupled to be spaced apart from each other at a predetermined distance. The upper panel of the plasma display panel 300 includes scan electrodes Y1 to Yn and sustain electrodes Z1 to Zn positioned parallel to each other, and the lower panel of the plasma display panel 300 includes address electrodes X1 to Xm crossing the scan electrodes Y1 to Yn and the sustain electrodes Z1 to Zn. A discharge cell C is formed at each crossing of the scan electrodes Y1 to Yn, the sustain electrodes Z1 to Zn, and the address electrodes X1 to Xm. Phosphors are coated on the discharge cells C to emit light during a sustain discharge.

The driver 400 supplies a reset rising signal, that gradually rises from a reference voltage to a first voltage V1, to the scan electrodes Y1 to Yn during a setup period of a reset period, thereby forming a sufficient amount of wall charges on the scan electrodes Y1 to Yn. The reference voltage may be a ground level voltage GND.

The driver 400 supplies a reset falling signal, that gradually falls to a second voltage V2, to the scan electrodes Y1 to Yn during a set-down period of the reset period. Hence, a portion of the wall charges formed during the setup period is erased, and a proper amount of wall charges remain on the scan electrodes Y1 to Yn to the extent that an address discharge can stably occur.

During an address period, the driver 400 supplies a scan signal falling to a scan voltage −Vy to the scan electrodes Y1 to Yn, and the driver 400 supplies a data signal, that is synchronized with the scan signal to rise to a data voltage Vd, to the address electrodes X1 to Xm. Hence, an address discharge occurs, thereby selecting the discharge cells to be turned on.

During the address period, the driver 400 supplies a sustain bias voltage Vbias to the sustain electrodes Z1 to Zn so that the address discharge smoothly occurs between the scan electrodes Y1 to Yn and the address electrodes X1 to Xm. The sustain bias voltage Vbias may be supplied during the set-down period and the address period.

During a sustain period, the driver 400 supplies sustain signals SUS, that allows a voltage difference between the scan electrodes Y1 to Yn and the sustain electrodes Z1 to Zn to be equal to a sustain voltage Vs, to the scan electrodes Y1 to Yn and the sustain electrodes Z1 to Zn so as to emit light from the selected discharge cells. Hence, light is emitted from the discharge cells selected during the address period.

FIGS. 8 to 11 illustrate a subfield arrangement for a drive of the display apparatus according to another exemplary embodiment.

Figure 8:
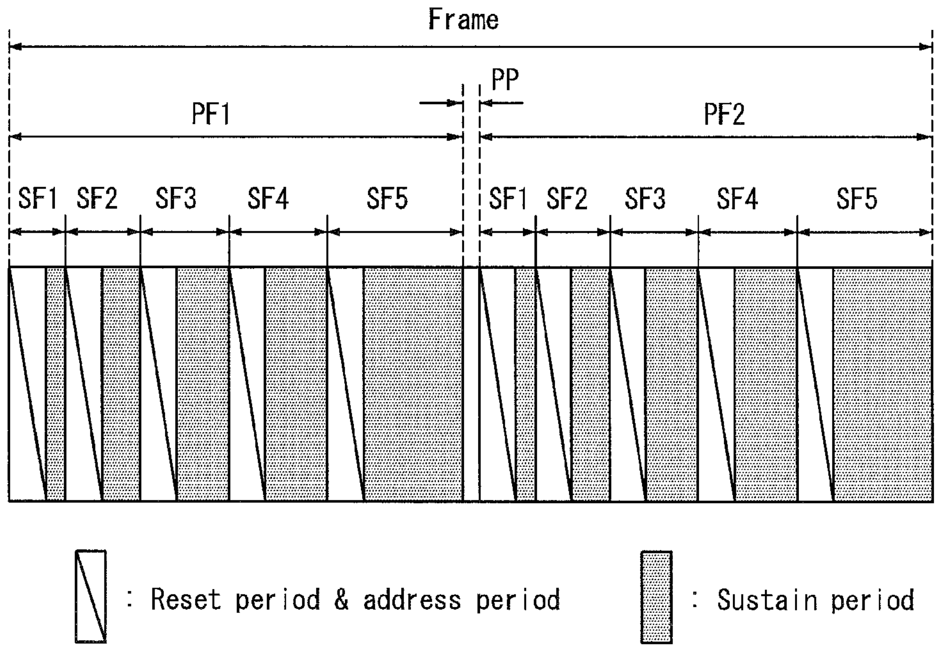
FIGS. 8 to 11 illustrate a subfield arrangement for a drive of the display apparatus according to another exemplary embodiment.

As shown in FIG. 8, the display apparatus displays a left eye image and a right eye image during a frame including a first partial frame PF1 and a second partial frame PF2 so as to display a 3D image. The driver 400 stops the supply of driving signals for the left eye image or the right eye image during a pause period pp between a display period of the left eye image and a display period of the right eye image.

Because the supply of driving signals stops during the pause period pp, crosstalk caused by light hold periods of the phosphors coated on the discharge cell can be prevented. For example, when the left eye image is displayed and then the right eye image is displayed, the crosstalk in which green light of the left eye image is seen to overlap the right eye image, may occur. The left eye image and the right eye image have to be dividedly displayed so as to improve the image quality of the 3D image.

Accordingly, as shown in FIG. 8, when the supply of driving signals stops during a pause period pp between a first partial frame PF1 during which one of the left eye image and the right eye image is displayed and a second partial frame PF2 during which the other image is displayed, an image is not displayed during the pause period pp. Therefore, a possibility in which light emitted from the phosphor, whose the light hold period is long, overlaps the image displayed during the second partial frame PF2 decreases.

When the first partial frame PF1 is arranged before the pause period pp and the second partial frame PF2 is arranged after the pause period pp, a weight value of a subfield adjacent to the pause period pp in subfields belonging to the first partial frame PF1 may be smaller than a maximum value of weight values of the other subfields except the subfield adjacent to the pause period pp.

Figure 9:
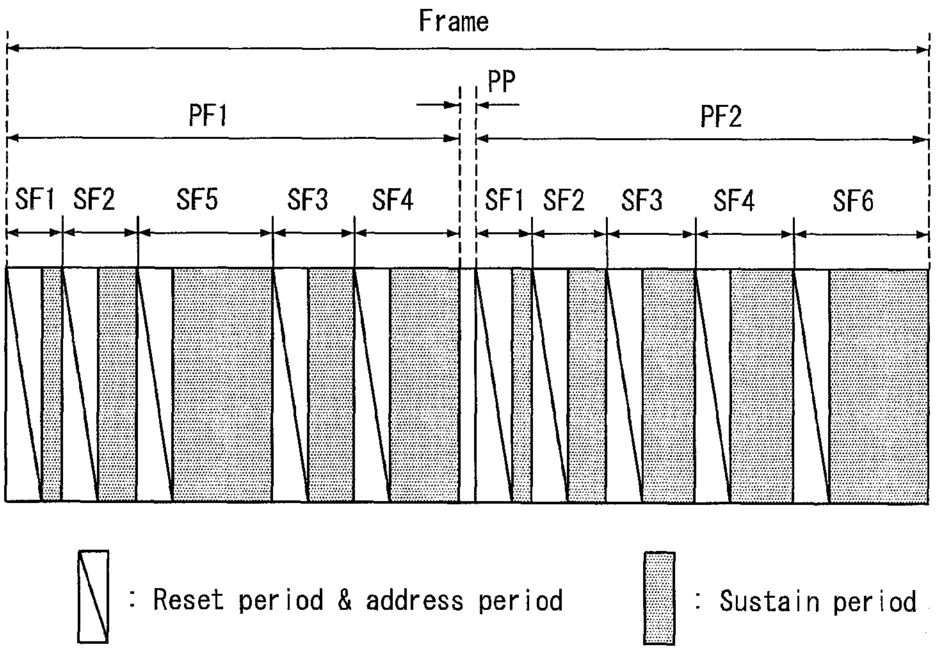

For example, as shown in FIG. 9, if the first partial frame PF1 includes 1st to 5th subfields SF1 to SF5, a weight value of the 4th subfield SF4 adjacent to the pause period pp is smaller than a weight value of the 5th subfield SF5 of the first partial frame PF1.

When the weight value of the subfield of the first partial frame PF1 adjacent to the pause period pp is equal to the maximum value of the weight values of the subfields of the first partial frame PF1, the amount of light emitted from the plasma display panel during the adjacent subfield is maximized. Therefore, the possibility of causing the crosstalk between an image displayed during the first partial frame PF1 and an image displayed during the second partial frame PF2 increases.

Accordingly, if the weight value of the subfield of the first partial frame PF1 adjacent to the pause period pp is not equal to the maximum weight value of the first partial frame PF1, the possibility of causing the crosstalk between an image displayed during the first partial frame PF1 and an image displayed during the second partial frame PF2 decreases. Hence, the image quality of the 3D image is improved.

In FIG. 9, the first partial frame PF1 and the second partial frame PF2 include the same subfields SF1 to SF5, but the first partial frame PF1 and the second partial frame PF2 may include different subfields. For example, the first partial frame PF1 may include 1st to 5th subfields, and the second partial frame PF2 may include 1st to 4th subfields and a 6th subfield having a weight value larger than a weight value of the 5th subfield.

Figure 10:
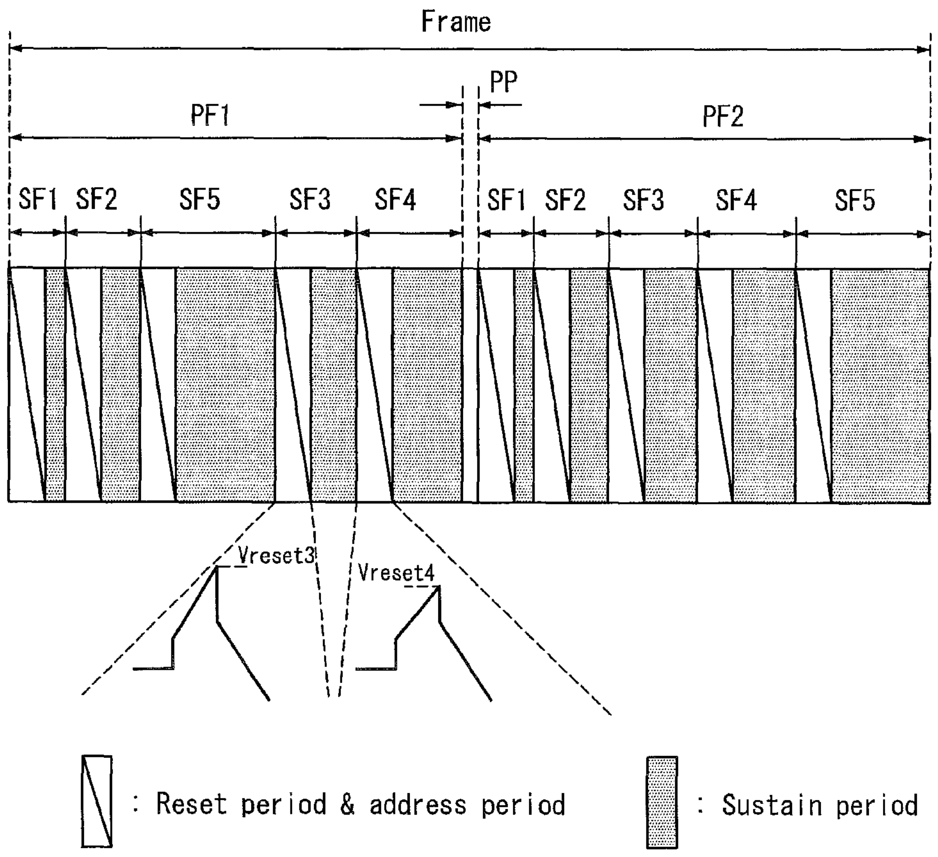

As shown in FIG. 10, a highest voltage of a reset signal supplied in the subfield of the first partial frame PF1 adjacent to the pause period pp may be smaller than highest voltages of reset signals supplied in the other subfields except the subfield adjacent to the pause period pp. For example, a highest voltage Vreset4 of a reset signal supplied in the 4th subfield SF4 adjacent to the pause period pp is smaller than a highest voltage Vreset3 of a reset signal supplied in the 3rd subfield SF3 of the first partial frame PF1. Hence, because the amount of light emitted during a reset period of the subfield adjacent to the pause period pp decreases, occurrence of the crosstalk between the image displayed during the first partial frame PF1 and the image displayed during the second partial frame PF2 decreases.

Figure 11:
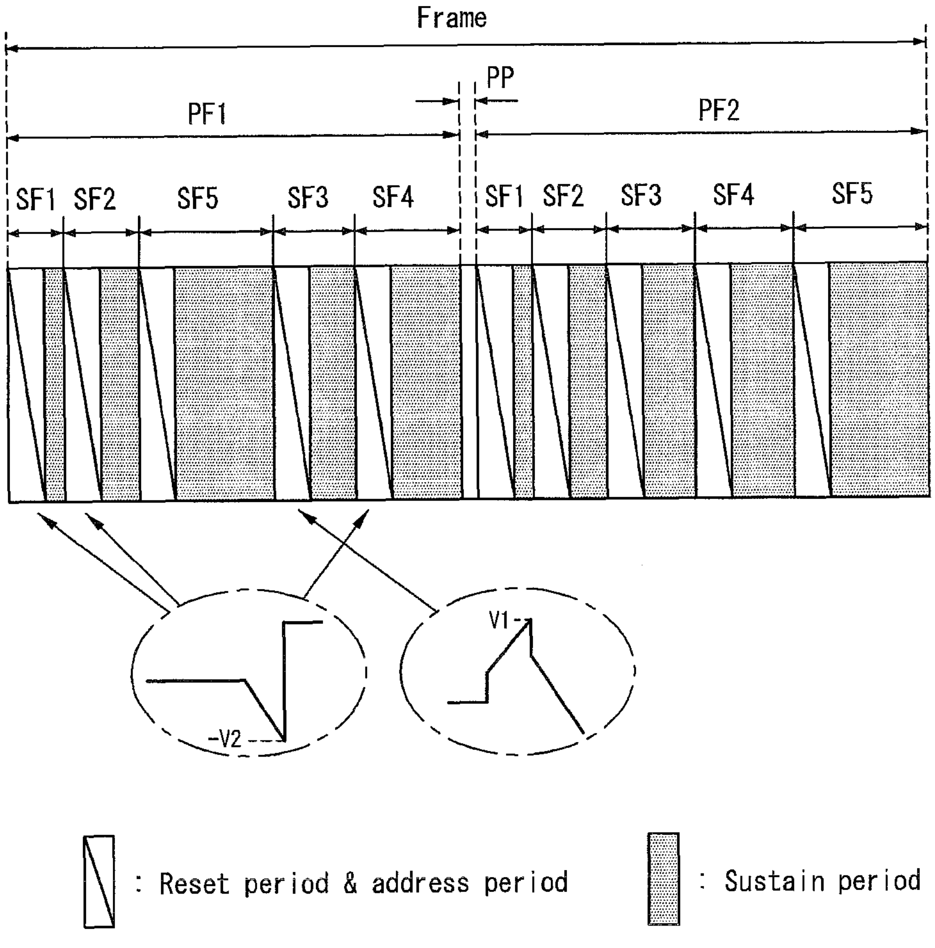

As shown in FIG. 11, a reset rising signal with a gradually rising voltage and a reset falling signal with a gradually falling voltage may be supplied to at least one of the subfields SF1, SF2, SF3 and SF5 except the subfield SF4 adjacent to the pause period pp in the subfields SF1 to SF5 of the first partial frame PF1. In other words, because only the reset falling signal is supplied in the subfield SF4 adjacent to the pause period pp, the amount of light emitted during a reset period of the subfield SF4 decreases. Hence, the crosstalk between an image displayed during the first partial frame PF1 and an image displayed during the second partial frame PF2 decreases.

FIGS. 12 to 15 illustrate another subfield arrangement for a drive of the plasma display apparatus according to another exemplary embodiment.

Figure 12:
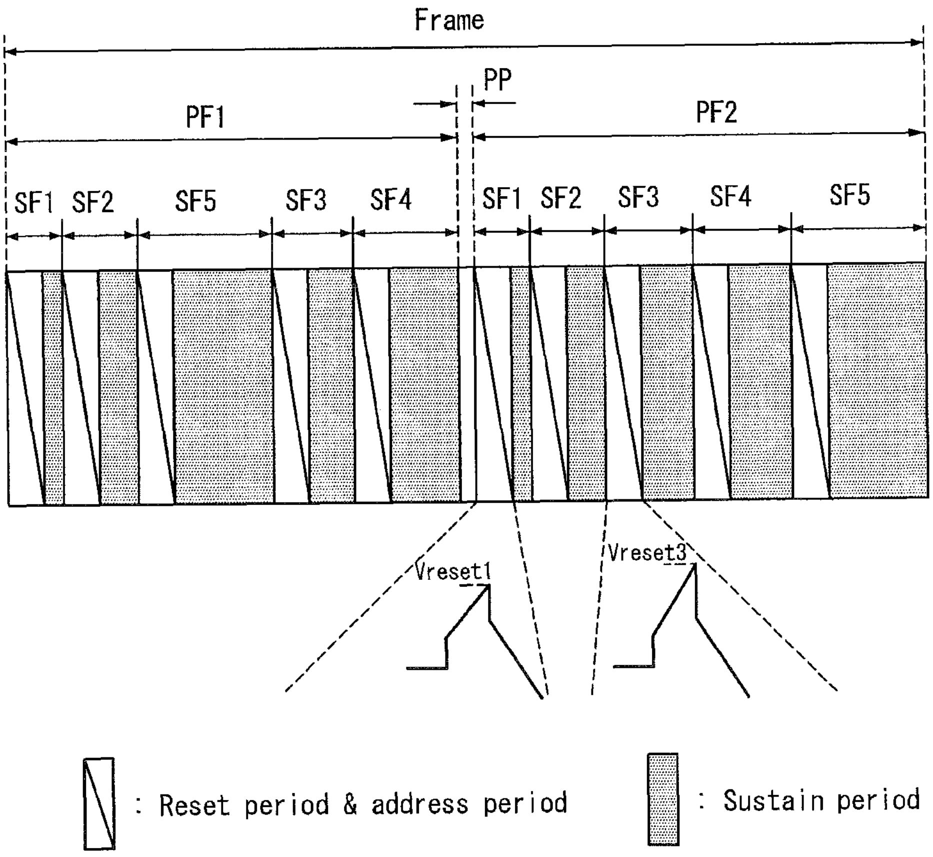
FIGS. 12 to 15 illustrate another subfield arrangement for a drive of the plasma display apparatus according to another exemplary embodiment.

A highest voltage of a reset signal supplied in a subfield adjacent to the pause period pp in the second partial frame PF2 may be smaller than highest voltages of reset signals supplied in the other subfields except the subfield adjacent to the pause period pp. For example, as shown in FIG. 12, a highest voltage Vreset1 of a reset signal supplied in a 1st subfield SF1 adjacent to the pause period pp in the second partial frame PF2 is smaller than a highest voltage Vreset3 of a reset signal supplied in a 3rd subfield SF3 of the second partial frame PF2. Hence, an erroneous discharge can be prevented.

Figure 13:
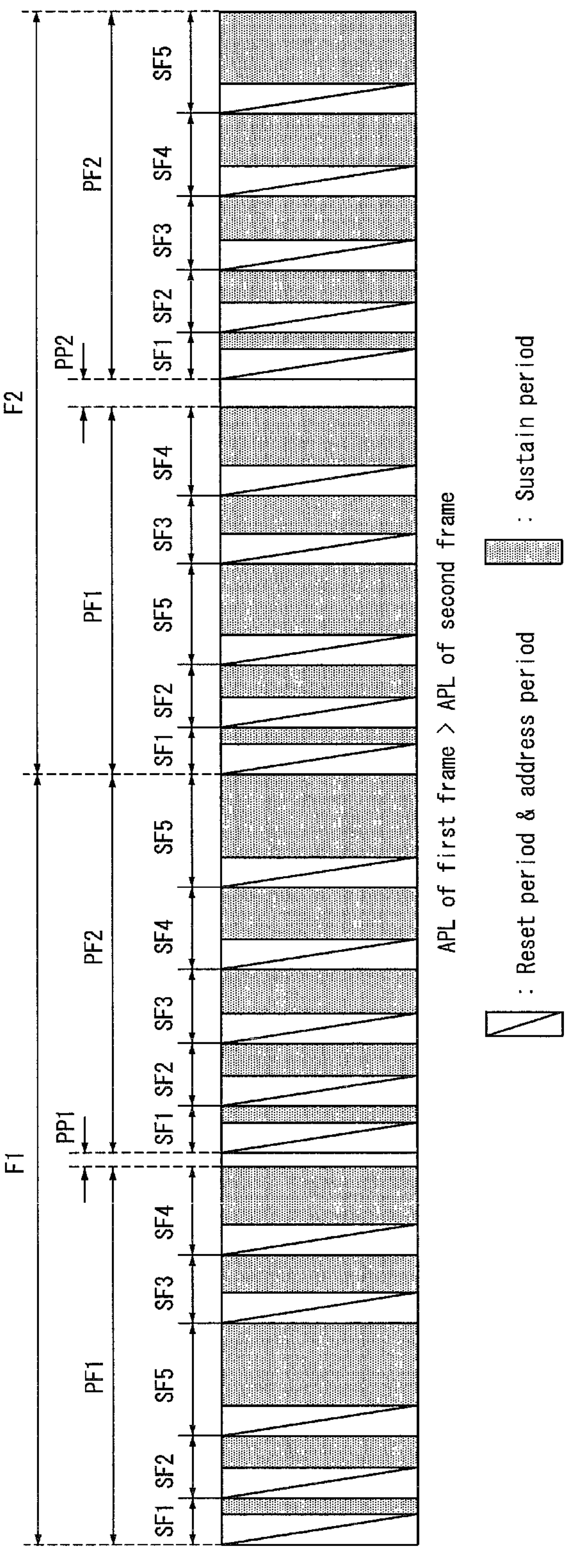

As shown in FIG. 13, when the plasma display panel displays a left eye image and a right eye image in each of a first frame F1 and a second frame F2, if an average picture level (APL) in the first frame F1 is larger than an APL in the second frame F2, a length of a pause period pp1 of the first frame F1 may be shorter than a length of a pause period pp2 of the second frame F2.

In other words, if the APL in the first frame F1 is larger than the APL in the second frame F2, the number of sustain signals assigned in the first frame F1 is smaller than the number of sustain signals assigned in the second frame F2. Accordingly, a luminance of an image in the first frame F1 is reduced, and thus the length of the pause period pp1 of the first frame F1 may be shorter than the length of the pause period pp2 of the second frame F2.

As described above, because the length of the pause period changes depending on the APL of the frame, a reduction in a luminance of the 3D image caused by a reduction in a length of a sustain period can be prevented while crosstalk of the 3D image is prevented.

The first frame F1 may or may not be adjacent to the second frame F2. The first frame F1 may be prior to the second frame F2 in time order, or the first frame F1 may follow the second frame F2.

Figure 14:
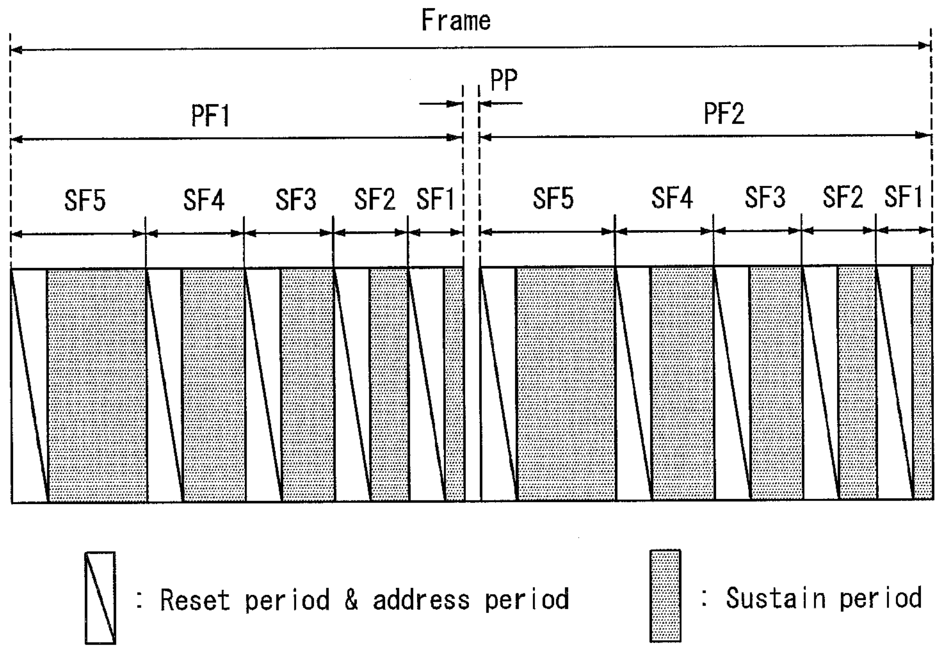

As shown in FIG. 14, when a first partial frame PF1 and a second partial frame PF2 are arranged before and after a pause period pp, respectively, subfields belonging to the first partial frame PF1 and subfields belonging to the second partial frame PF2 may be arranged in decreasing order of weight values. Because a weight value of a 1st subfield SF1 of the first partial frame PF1 adjacent to the pause period pp is smaller than weight values of the other subfields SF2 to SF5 of the first partial frame PF1, crosstalk is prevented. The subfields belonging to the first partial frame PF1 and the subfields belonging to the second partial frame PF2 may be the same as or different from each other.

Figure 15:
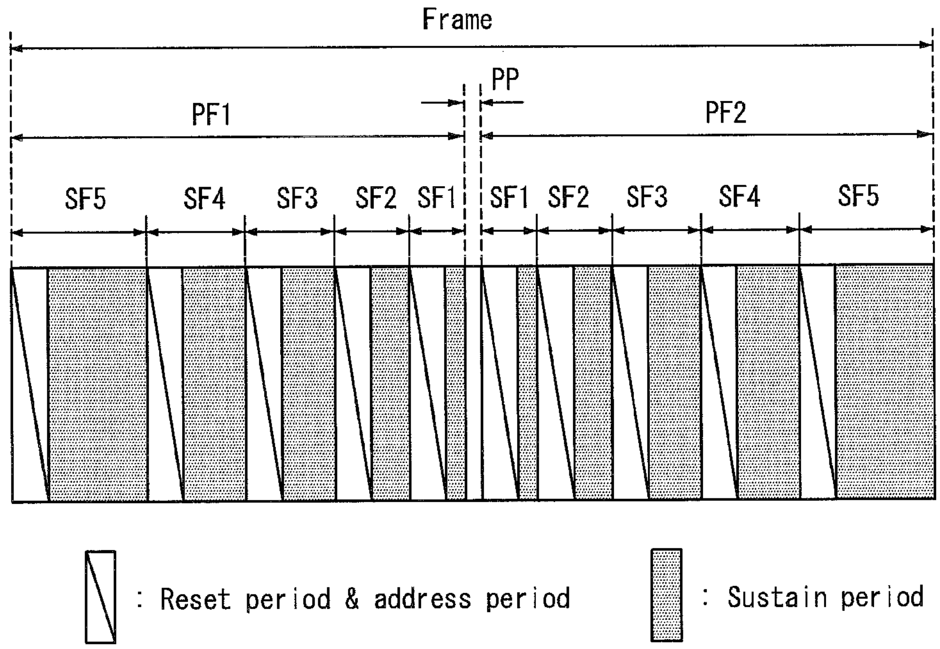

As shown in FIG. 15, when a first partial frame PF1 and a second partial frame PF2 are arranged before and after a pause period pp, respectively, subfields belonging to the first partial frame PF1 may be arranged in decreasing order of weight values, and subfields belonging to the second partial frame PF2 may be arranged in increasing order of weight values. Similar to the description of FIG. 14, because a weight value of a 1st subfield SF1 of the first partial frame PF1 adjacent to the pause period pp is smaller than weight values of the other subfields SF2 to SF5 of the first partial frame PF1, crosstalk is prevented. The subfields belonging to the first partial frame PF1 and the subfields belonging to the second partial frame PF2 may be the same as or different from each other.

The foregoing embodiments and advantages are merely exemplary and are not to be construed as limiting the exemplary embodiments. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A display apparatus comprising:

a display panel that displays at least one of a two dimensional (2D) image and a three dimensional (3D) image; and a driver that is driven so as to display an image on the display panel, the driver including a 3D image conversion unit that converts the 3D image into a protective image when a length of a period during which the 3D image is displayed on the display panel is longer than a length of a first period, wherein the protective image is one of a green image in which an entire image gradually changes to green, or a blue image in which the entire image gradually changes to blue, wherein a frame corresponding to the three dimensional (3D) image includes a first partial frame and a second partial frame provided after the first partial frame, wherein a pause period is provided between the first partial frame and the second partial frame, wherein a weight value of a last subfield from among the plurality of subfields belonging to the first partial frame is less than a maximum value of a weight value of a subfield belonging to the first partial frame, wherein a weight value of a first subfield from among the plurality of subfields belonging to the second partial frame is less than a maximum value of a weight value of a subfield belonging to the second partial frame, wherein a highest voltage of a reset signal supplied in the last subfield of the first partial frame is less than a maximum value of a highest voltage of a reset signal supplied in a subfield belonging to the first partial frame, wherein a highest voltage of a reset signal supplied in the first subfield of the second partial frame is less than a maximum value of a highest voltage of a reset signal supplied in a subfield belonging to the second partial frame, and wherein a length of the pause period decreases as an average picture level (APL) of the frame corresponding to the three dimensional (3D) image increases.

2. The display apparatus of claim 1, wherein the 3D image includes at least two images each having a different time point.

3. The display apparatus of claim 2, wherein the protective image is one of the at least two images each having the different time point.

4. The display apparatus of claim 2, wherein the protective image is an image obtained by interpolating the at least two images each having the different time point.

5. The display apparatus of claim 1, wherein the driver further includes a selection unit so that a user can select whether to convert the 3D image into the protective image or continuously display the 3D image on the display panel using the selection unit.

6. The display apparatus of claim 5, wherein before the user selects whether to convert the 3D image into the protective image or continuously display the 3D image on the display panel, the driver allows a warning to be displayed on a screen of the display panel.

7. The display apparatus of claim 6, further comprising a 3D goggle, wherein the protective image is a left eye image and a right eye image displayed by simultaneously turning on a left eye shutter and a right eye shutter of the 3D goggle.

8. The display apparatus of claim 1, wherein the protective image is an image previously stored in the display apparatus.

9. The display apparatus of claim 1, wherein a user can control the first period.

10. The display apparatus of claim 1, wherein after the 3D image is converted into the protective image, a user selects a conversion of the protective image into the 3D image, or wherein after the 3D image is converted into the protective image, when a length of a display period of the protective image is longer than a length of a second period, the protective image is automatically converted into the 3D image.

* * * * *